United States Patent
Sulkowski et al.

(10) Patent No.: US 7,297,880 B2
(45) Date of Patent: Nov. 20, 2007

(54) LOAD LIMITER FOR STRAIN GAUGE OCCUPANT CLASSIFICATION SENSOR

(75) Inventors: Michael Sulkowski, Commerce Township, MI (US); Issam Al-Khairy, Windsor (CA)

(73) Assignee: Chrysler LLC, Auburn Hills, MI (US)

( * ) Notice: Subject to any disclaimer, the term of this patent is extended or adjusted under 35 U.S.C. 154(b) by 326 days.

(21) Appl. No.: 10/939,554

(22) Filed: Sep. 13, 2004

(65) Prior Publication Data

US 2006/0054766 A1 Mar. 16, 2006

(51) Int. Cl.
*G01G 19/52* (2006.01)
*G01G 23/02* (2006.01)
*B60R 21/32* (2006.01)

(52) U.S. Cl. .................. 177/144; 73/862.62; 177/136; 177/154; 280/735

(58) Field of Classification Search ............... 177/136, 177/144, 154–157; 280/735; 73/862.627, 73/862.381; 297/217.2
See application file for complete search history.

(56) References Cited

U.S. PATENT DOCUMENTS

| 4,361,199 A | 11/1982 | Ulicny |
| 4,420,054 A | 12/1983 | Caris |
| 6,323,443 B1 * | 11/2001 | Aoki et al. .................. 177/144 |
| 6,331,682 B1 | 12/2001 | Hopkins et al. |
| 6,729,193 B2 * | 5/2004 | Ishida .................... 73/862.627 |
| 6,916,997 B2 * | 7/2005 | Thakur et al. .............. 177/136 |
| 6,969,809 B2 * | 11/2005 | Rainey ........................ 177/136 |
| 6,981,717 B2 * | 1/2006 | Sakamoto et al. .......... 280/735 |
| 7,044,006 B2 * | 5/2006 | Kouyama et al. ...... 73/862.381 |

OTHER PUBLICATIONS

Lebow Model 6214 Data Sheet (http://www.lebow.com/prodfolder/6214.pdf).
Co-pending U.S. Appl. No. 10/754,859, filed Jan. 9, 2004, entitled "Shock Resistant Strain Gage-Seat Mounted".

* cited by examiner

*Primary Examiner*—Carl D. Friedman
*Assistant Examiner*—Tan Le
(74) *Attorney, Agent, or Firm*—Ralph E. Smith

(57) ABSTRACT

An over-travel protection device for mounting an occupant classification sensor having a deflecting member, the sensor being mounted between first and second seat mounting portions, is described. The device has a sensor plate positioned adjacent the occupant classification sensor and a spacer having a land. The spacer is positioned adjacent to the occupant classification sensor. A compliant element is located between the sensor plate and the second seat mounting portion. The land is spaced from the first mounting portion until the deflecting member deflects a predetermined amount, causing the land to abut the first seat mounting portion and thereby preventing further displacement of the deflecting member.

12 Claims, 1 Drawing Sheet

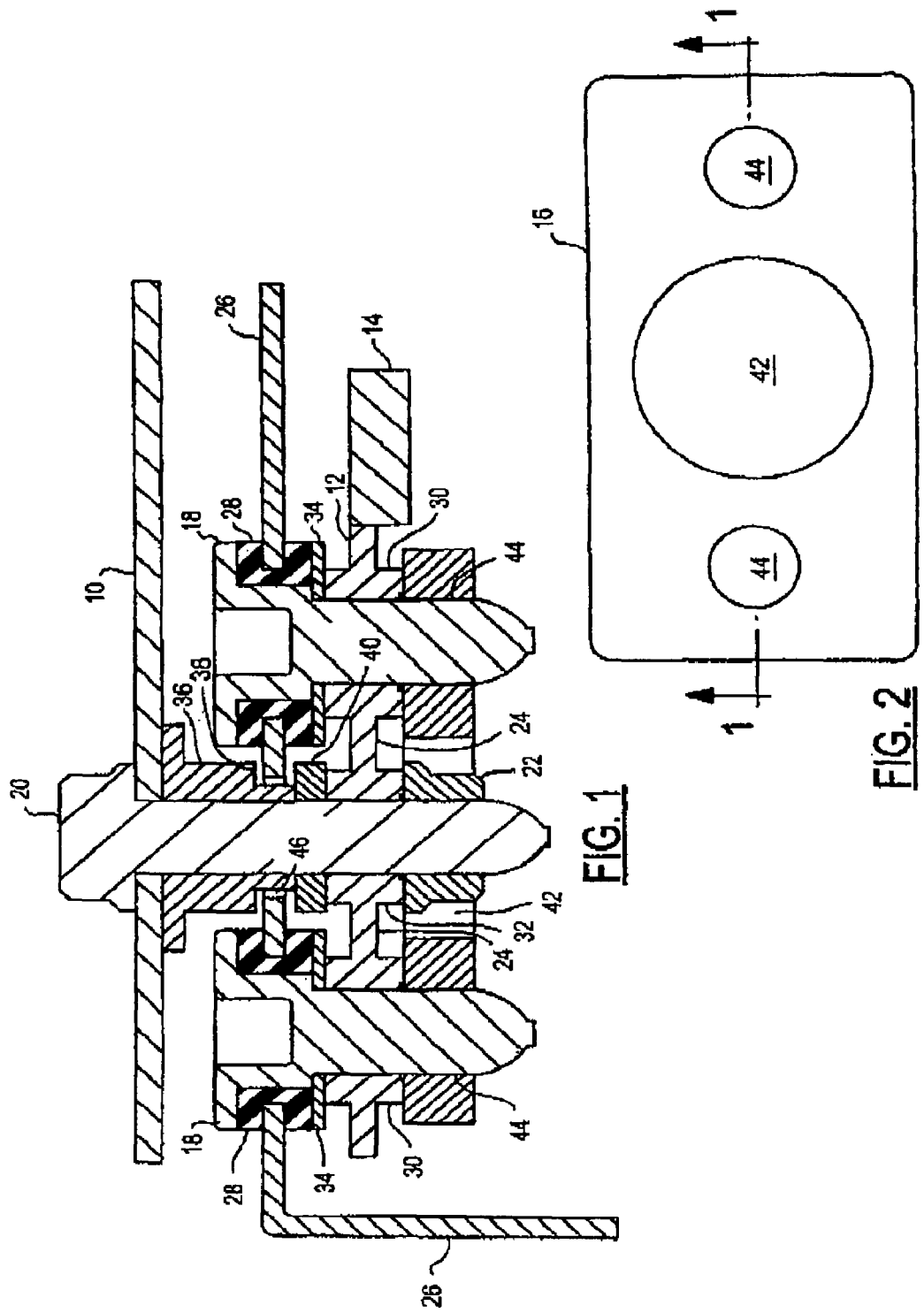

LOAD LIMITER FOR STRAIN GAUGE OCCUPANT CLASSIFICATION SENSOR

FIELD OF THE INVENTION

This invention relates generally to methods of attaching an occupant classification sensor to a vehicle, and more particularly to methods of preventing over-extension or over-compression of the sensor.

BACKGROUND

A common type of occupant classification sensor uses a load cell to determine the weight of a vehicle occupant. The sensor is located in a load path between an occupant's seat and the vehicle floor. While the occupant is seated his weight causes a load beam within the cell to deflect. A sense element is mounted to the load beam and is deflected therewith. The sense element converts this deflection into an electrical property indicative of the occupant's weight. If the load beam is subjected to a large enough force, however, it may be deflected beyond its range of elasticity and assume a permanent deflection or "offset". This offset is undesirable and, depending on the magnitude of offset and the ability of other electronics in the occupant classification system to compensate for it, may result in a need to replace the sensor.

It is therefore desirable to provide a method for mounting an occupant classification sensor which prevents over-deflection of the sensor's load beam or similar deflecting member.

SUMMARY OF THE INVENTION

Accordingly, an aspect of the present invention is to provide an apparatus for mounting an occupant classification sensor which limits movement of the sensor's load beam or other deflecting member.

In accordance with these aspects, an over-travel protection device for mounting an occupant classification sensor having a deflecting member, the sensor being mounted between first and second seat mounting portions, is described. The device has a sensor plate positioned adjacent the occupant classification sensor and a spacer having a land. The spacer is positioned adjacent to the occupant classification sensor. A compliant element is located between the sensor plate and the second seat mounting portion. The land is spaced from the first mounting portion until the deflecting member deflects a predetermined amount, causing the land to abut the first seat mounting portion and thereby preventing further displacement of the deflecting member.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

FIG. 1 shows a cross-section of an over-travel protection device in-situ, and

FIG. 2 shows a plan view of a sensor plate of the device shown in FIG. 1.

DETAILED DESCRIPTION OF THE PREFERRED EMBODIMENT

Turning to FIG. 1, an over-travel protection device is shown attached to an occupant classification sensor (OCS) 12 and first and second mounting portions of a vehicle seat assembly. In the depicted embodiment, the first mounting portion is a seat rail 10, and the second mounting portion is a seat riser 26. The OCS is of a type known in the art, and has deflecting members, such as beams 24, which are positioned between outer bushings 30 and a center bushing 32. The outer bushings 30 are indirectly mounted to the seat riser 26 via the over-travel protection device. The center bushing is indirectly connected to the seat rail 10 via the over-travel protection device. The beams 24 deflect when a force is applied to the OCS through center bushing 32. The deflection of the beams cause an electrical signal to vary in accordance with the magnitude of the force, and the electrical signal is available for use through a connector 14. While a single over-travel protection device is shown, it is understood that an occupant classification system may use more than one of the arrangements shown in FIG. 1 for each vehicle seat. For example, a seat may have such an arrangement at each corner, for a total of four.

The over travel protection device has a sensor plate 16 that has a clearance hole 42 and a pair of threaded holes 44 disposed therein. Each threaded hole 44 receives the threaded end of a shoulder bolt 18. The shoulder bolts 18 are preferably of a socket-head type. Each shoulder bolt 18 passes through a pliable element, such as grommet 28. The grommets 28 are positioned in holes formed in the seat riser 26, and each grommet has a peripheral radial groove for engaging the periphery of its mating hole in the seat riser 26. Spacers 34 retain the grommets 28 in their position against the head of shoulder bolts 18. The spacers 34 also facilitate in clamping the outer bushings 30 of the OCS 12. The grommets 28 operate to absorb minor coplanarity differences between the faces of the outer bushings 30 and the seat riser 26. Absorbing the coplanarity differences operates to reduce undesirable offset in the electrical signal available at connector 14.

The over travel protection device also has a center bolt 20. The center bolt 20 passes through an opening in the seat rail 10, an axial bore though spacer 36, a washer 40, the center bushing 32, and a threaded nut 22. The threaded nut 22 and center bushing 32 are spaced away from the sensor plate 16 by virtue of a clearance hole 42 formed in the sensor plate 16. The spacer 36 has a body of a first diameter which necks down to a second diameter. The spacer portion which has necks down to a second diameter passes through an orifice 46 formed in the seat riser 26. The boundary region between the first diameter and the second diameter forms an upper land 38. Washer 40 forms a lower land in the plane interfacing with the spacer 36.

The diameter of orifice 46 is less than the first diameter of spacer 36, and greater that the second diameter of spacer 26. The axial length of the portion of spacer 26 which is necked down to the second diameter is greater than the thickness of the material used to form the seat riser 26.

In operation, the seat riser 26 is made fast to the vehicle floor as is known in the art (not shown). The seat rail 10 transfers a force, such as from the weight of a seat occupant, to the center bushing 32 of OCS 20 via spacer 36, washer 40, and nut 22. The force applied to the center bushing of the OCS causes the beams 24 to deflect since their opposite ends are motion restrained by outer bushings 30. Also, a reactive force distributed through shoulder bolts 18 causes grommets 28 to deflect. In the event the applied force is sufficiently great, the beams 24 and grommets 28 will deflect until either the upper land 38 or washer 40 comes into contact with the seat riser 26. Once contact occurs, the magnitude of the force applied to the OCS is clipped at a magnitude depending on the spring constant of the beams 24 and the magnitude of deflection. The remainder of the force in excess of the clipped magnitude is shunted around the OCS through the seat riser 26 and either upper land 36 or washer 40, depending on the direction of the force. If the force is downward on the seat rail 10, then upper land 38 will operate to shunt the excess force to the seat riser 26. On the other hand, if the force is upward on the seat rail 10, then the washer 40 will operate to shunt the excess force to the seat riser 26.

Turning now to FIG. 2, a plan view of the sensor plate 16 is shown. The sensor plate 16 has two threaded holes 44 for receiving the threaded ends of shoulder bolts 18. A clearance hole 42 is formed therein of a sufficient diameter to prevent the sensor plate 16 from contacting wither the nut 22 or the center bushing 32. In one aspect of the invention, the diameter of clearance hole 42 is sufficient to allow a tool to engage and apply torque to nut 22.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An over-travel protection device comprising:
   a first seat mounting portion;
   a second seat mounting portion spaced apart from said first seat mounting portion;
   an occupant classification sensor having a pair of deflecting members mounted to said second seat mounting portion, said occupant classification sensor having an upper surface and a lower surface;
   a sensor plate attached to said lower surface of said occupant classification sensor;
   a spacer having a land mounted to said first seat mounting portion, said spacer being positioned adjacent to said upper surface of said occupant classification sensor; and
   a compliant element located between said occupant classification sensor and said second seat mounting portion, said land being spaced from said second mounting portion until said deflecting members and said compliant element deflect a predetermined amount, causing the land to abut said second seat mounting portion and thereby preventing further displacement of the deflecting members and compliant element.

2. The device of claim 1 wherein said first seat mounting portion comprises a seat rail and said second seat mounting portion comprises a seat riser.

3. The device of claim 1, further comprising a washer forming a second land spaced from the second seat mounting portion until said deflecting member deflects a predetermined amount in a negative direction, causing said second land to abut said second seat mounting portion and thereby preventing further displacement of said deflecting members and compliant element.

4. The device of claim 3, further comprising a fastener for securing said spacer, washer, and the occupant classification sensor to said second seat mounting portion.

5. The device of claim 4 wherein said sensor plate has a clearance hole disposed therein, said clearance hole allowing said fastener to enter therein.

6. The device of claim 3 wherein said first and second lands abut an orifice periphery of said second seat mounting portion to prevent further displacement of said deflecting members and said compliant element.

7. An over-travel protection device, comprising:
   a seat rail;
   a seat riser separated from said seat rail;
   an occupant classification sensor including a pair of deflecting members mounted to a side of said seat riser opposite said seat rail, said occupant classification sensor mounted to said seat riser via a pair of fasteners attached to said seat riser via a pair of deflectable grommets;
   a sensor plate mounted to said occupant classification sensor on a side of said occupant classification sensor opposite said seat riser;
   a spacer having a land mounted between said seat rail and said seat riser; and
   a washer disposed between said occupant classification sensor and said seat riser,
   wherein upon deflection of said deflecting members and said deflectable grommets in a first direction, said land will abut said seat riser, and upon deflection of said deflecting members and said deflectable grommets in a second direction, said washer will abut said seat riser.

8. The over-travel protection device of claim 7, wherein said sensor plate includes a plurality of openings that correspond to said fasteners.

9. The over-travel protection device of claim 7, wherein said grommets are formed of a compliant material.

10. The over-travel protection device of claim 7, wherein said grommets include a peripheral radial groove for engaging said seat riser.

11. The over-travel protection device of claim 7, wherein said grommets operate to absorb minor coplanarity differences in said occupant classification sensor.

12. The over-travel protection device of claim 7, wherein said spacer has a body of a first diameter that necks down to a second diameter.

* * * * *